United States Patent
Shao et al.

(10) Patent No.: US 9,195,552 B2
(45) Date of Patent: Nov. 24, 2015

(54) PER-FUNCTION DOWNSTREAM PORT CONTAINMENT

(71) Applicant: FutureWei Technologies, Inc., Plano, TX (US)

(72) Inventors: Wesley Shao, Union City, CA (US); Muhui Lin, Hangzhou (CN)

(73) Assignee: Futurewei Technologies, Inc., Plano, TX (US)

(\*) Notice: Subject to any disclaimer, the term of this patent is extended or adjusted under 35 U.S.C. 154(b) by 101 days.

(21) Appl. No.: 14/173,643

(22) Filed: Feb. 5, 2014

(65) Prior Publication Data

US 2015/0220409 A1    Aug. 6, 2015

(51) Int. Cl.
  *G06F 9/50* (2006.01)
  *G06F 11/20* (2006.01)
  *G06F 13/40* (2006.01)

(52) U.S. Cl.
  CPC ........ *G06F 11/2007* (2013.01); *G06F 13/4022* (2013.01)

(58) Field of Classification Search
  CPC ............ H04L 41/0663; H04L 41/0659; H04L 41/0654; H04L 49/25; H04L 45/28; H04L 41/0631; G06F 11/0793; G06F 2213/0026
  See application file for complete search history.

(56) References Cited

U.S. PATENT DOCUMENTS

| | | | |
|---|---|---|---|
| 7,752,346 B2 * | 7/2010 | Talayco et al. | 710/9 |
| 8,582,454 B2 * | 11/2013 | Singhal et al. | 370/252 |
| 2009/0164694 A1 * | 6/2009 | Talayco et al. | 710/316 |
| 2015/0026385 A1 * | 1/2015 | Egi et al. | 710/314 |

OTHER PUBLICATIONS

"Single Root I/O Virtualization and Sharing Specification Revision 1.1", PCI-SIG, Jan. 20, 2010, 90 pages.
"PCI Express Base Specification Revision 3.0", PCI-Express, Nov. 10, 2010, 860 pages.
"Downstream Port Containment (DPC)," PCI-SIG Engineering Change Notice, PCI-SIG, Feb. 9, 2012, 20 pages.
"Enhanced DPC (eDPC)" PCI-SIG Engineering Change Notification, PCI-SIG, Nov. 15, 2012, 34 pages.

\* cited by examiner

*Primary Examiner* — Nadeem Iqbal
(74) *Attorney, Agent, or Firm* — Slater & Matsil, L.L.P.

(57) ABSTRACT

Per-Function Downstream Port Containment (pF-DPC) is an extension to Downstream Port Containment (DPC) in the Peripheral Component Interconnect express (PCIe) standard. Pf-DPC confines non-fatal errors to specific functions of an end-point device without disabling the link between a PCIe port and the end-point device. PCIe ports configured for pF-DPC may filter (e.g., drop) packets carrying routing identifiers (RIDs) and/or addresses assigned to a function affected by a non-fatal error, while continuing to forward packets carrying RIDs/addresses associated with remaining operable functions over the corresponding link.

24 Claims, 6 Drawing Sheets

PER-FUNCTION DOWNSTREAM PORT CONTAINMENT

TECHNICAL FIELD

The present invention relates generally to Peripheral Component Interconnect Express (PCIe) buses, and in particular embodiments, to per function downstream port containment (DPC).

BACKGROUND

A Peripheral Component Interconnect (PCI) bus is a local computer bus for attaching hardware devices in a computer. The PCI bus supports the functions found on a processor bus. Devices connected to the bus appear to the processor to be connected directly to the processor bus, and are assigned addresses in the processor's address space. Attached devices can take either the form of an integrated circuit fitted onto the motherboard itself or an expansion card that fits into a slot. PCI Express (PCIe) is a high-speed expansion to the original PCI bus standard, and offers numerous improvements including higher maximum system bus throughput, lower pin count, smaller physical footprint, and better performance-scaling for bus devices.

SUMMARY OF THE INVENTION

Technical advantages are generally achieved, by embodiments of this disclosure which describe per function downstream port containment.

In accordance with an embodiment, a method for per-function downstream port containment is provided. In this example, the method comprises receiving a read or write request on a Peripheral Component Interconnect (PCI) Express (PCIe) interface. The read or write request comprises a first routing identifier (RID) associated with a first function of an end-point device. The method further includes detecting a non-fatal error of the first function of the end-point device, identifying a first range of addresses assigned to the first function of the end-point device by searching an address table for entries associated with the first RID, and filtering packets carrying the first RID or addresses within the first range of addresses without de-activating a link between the PCIe interface and the end-point device. An apparatus for performing this method is also provided.

In accordance with another embodiment, a Peripheral Component Interconnect Express (PCIe) switching fabric is provided. In this example, the PCIe fabric includes an upstream PCIe interface and a downstream PCIe interface coupled between the upstream PCIe interface and an end-point device. The downstream PCIe interface is configured to receive a read or write request comprising a first routing identifier (RID) associated with a first function of the end-point device. The downstream PCIe interface is further configured to detect a non-fatal error on the first function of the end-point device, to identify one or more address ranges assigned to the first function of the end-point device by searching an address table for entries associated with the first RID, and to filter packets carrying the first RID or an address within the one or more address ranges without de-activating a link between the PCIe interface and the end-point device.

In accordance with yet another embodiment, another method for per-Function downstream port containment is provided. In this example, the method includes receiving a read or write request on a Peripheral Component Interconnect (PCI) interface. The read or write request comprises a first address assigned to a first function of an end-point device. The method further includes detecting a non-fatal error on the first function of the end-point device, identifying a first routing identifier (RID) assigned to the first function of the end-point device by searching an address table for an entry associated with the first address, and filtering packets carrying the first RID without de-activating a link between the PCIe interface and the end-point device. An apparatus for performing this method is also provided.

In accordance with yet another embodiment, another Peripheral Component Interconnect express (PCIe) switching fabric is provided. In this example, the PCIe switching fabric includes an upstream PCIe interface, and a downstream PCIe interface coupled between the upstream PCIe interface and an end-point device. The downstream PCIe interface is configured to receive a read or write request carrying a first address assigned to a first function of an end-point device, to detect a non-fatal error on the first function of the end-point device, to identify a first routing identifier (RID) assigned to the first function of the end-point device by searching an address table for an entry associated with the first address, and to filter packets carrying the first RID without de-activating a link between the PCIe interface and the end-point device.

BRIEF DESCRIPTION OF THE DRAWINGS

For a more complete understanding of the present disclosure, and the advantages thereof, reference is now made to the following descriptions taken in conjunction with the accompanying drawings, in which.

Corresponding numerals and symbols in the different figures generally refer to corresponding parts unless otherwise indicated. The figures are drawn to clearly illustrate the relevant aspects of the embodiments and are not necessarily drawn to scale.

DETAILED DESCRIPTION OF ILLUSTRATIVE EMBODIMENTS

The making and using of embodiments of this disclosure are discussed in detail below. It should be appreciated, however, that the concepts disclosed herein can be embodied in a wide variety of specific contexts, and that the specific embodiments discussed herein are merely illustrative and do not serve to limit the scope of the claims. Further, it should be understood that various changes, substitutions and alterations can be made herein without departing from the spirit and scope of this disclosure as defined by the appended claims.

Downstream Port Containment (DPC) is a proposed extension to the PCIe standard, and is designed to automatically disable a link following a non-fatal (or fatal) error in order to prevent the potential spread of data corruption and enable error recovery if supported by software. Hence, DPC operates by disabling a link associated with an end-point device upon detecting an error associated with a function provided by the end-point device. However, end-point devices may provide multiple functions, and, in some instances, a non-fatal error may affect fewer than all of the functions provided by the end-point device. In such instances, it may be undesirable to completely shut-down/disable the link between the PCIe port and the end-point device, as doing so may prevent CPUs from accessing the remaining operable functions of the end-point device. Additionally, if the impacted function is the upstream port of a switch, completely disabling the link between a PCIe switch upstream port and its upstream device (root port or a downstream port of another switch) may cause the entire sub-fabric below the disabled link, including the switch and all of its ports and downstream devices to become inaccessible.

Aspects of this disclosure provide per-Function DPC (pF-DPC), which is an extension to DPC that confines non-fatal errors to specific functions of an end-point device without disabling the link between the PCIe port and the end-point device. More specifically, PCIe ports configured for pF-DPC may filter (e.g., drop) packets carrying routing identifiers (RIDs) and/or addresses assigned to a function affected by a non-fatal error, while continuing to forward packets carrying RIDs/addresses associated with remaining operable functions over the corresponding link. In some embodiments, PCIe ports in PCIe fabrics that utilize both RID forwarding and address forwarding may build and maintain address tables that associate RIDs with addresses and/or address-ranges assigned to end-point functions. These tables may be used by the PCIe port to identify addresses or RIDs associated with an end-point function experiencing an error, thereby allowing the PCIe port to provide comprehensive filtering when performing pF-DPC. These and other aspects are described in greater detail below.

Figure 1:
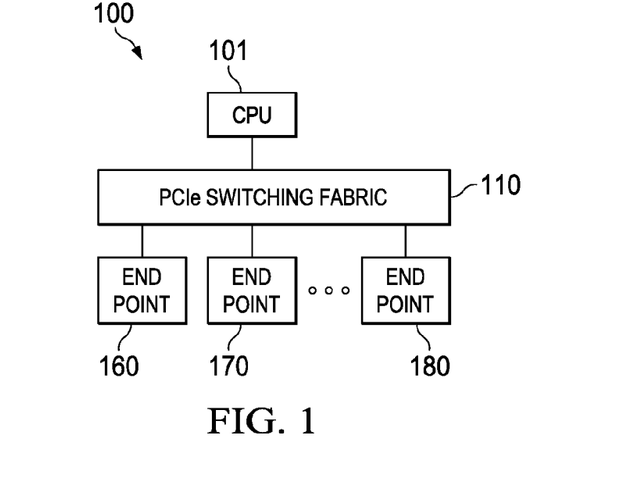
FIG. 1 illustrates a diagram of an embodiment PCIe network.
Figure 2:
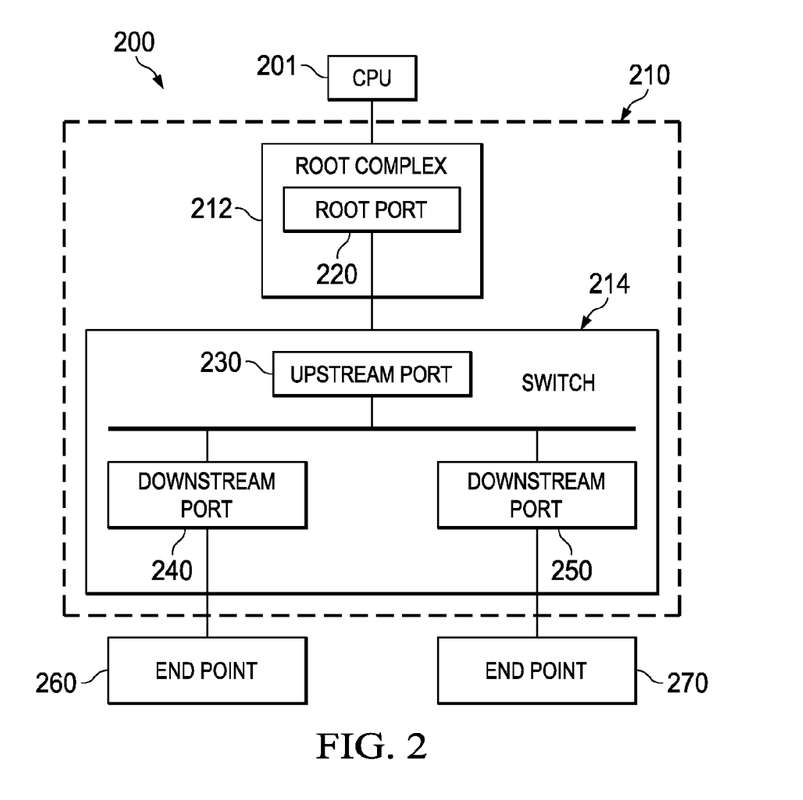
FIG. 2 illustrates a diagram of an embodiment PCIe architecture.

FIG. 1 illustrates a PCIe network 100 comprising a central processing unit (CPU) 101 configured to access a plurality of end-point devices 160, 170, 180 via a PCIe switching fabric 110. The CPU 101 may be any host system processor, while the end-point devices 160-180 may include any device configured to provide functions for utilization by the CPU 101, including user interfaces (e.g., screens, keyboards, etc.), external storage (e.g., disks, etc.), etc. The PCIe switching fabric 110 is a high-speed interconnect bus configured to operate in accordance with the PCI Express standard, such as PCI Express 3.0 or derivatives thereof. The PCIe architecture is shown in greater detail in FIG. 2, which illustrates a PCIe network 200 over which a CPU 201 accesses multiple end-point devices 260-270 via a PCIe switching fabric 210. As shown, the PCIe switching fabric 210 includes a root complex 212 and a switch 214. The root complex 212 may be coupled to the CPU 201 via a local bus, and may be configured to generate transaction requests on behalf of the CPU 201. Although the root complex 212 is depicted as a discrete device, in some embodiments the root complex 212 may be integrated on-board the CPU 201. The root complex 212 includes a root port 220, which may be a PCI Express port that is coupled to the CPU 201. In some embodiments, the root complex 212 includes more than one PCIe port. The switch 214 includes an upstream port 230 coupled to the root port 220, as well as downstream ports 240, 250 coupled to the end-points 260, 270, respectively.

Figure 3A:
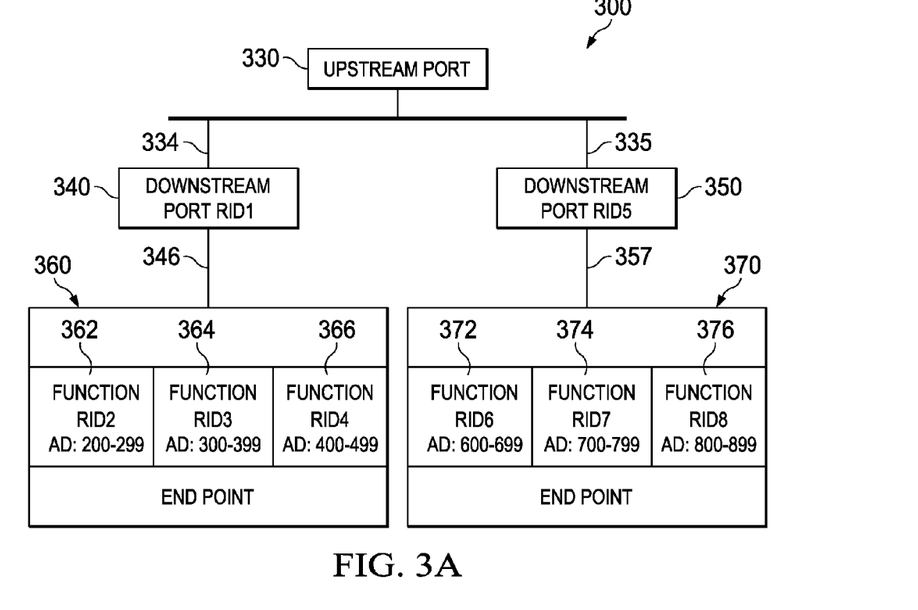
FIGS. 3A-3B illustrate a diagram of another embodiment PCIe network.

End-point devices may provide multiple functions, which are referred to herein as end-point functions. Each end-point function may be assigned a unique RID and several ranges of non-overlapping addresses. FIG. 3A illustrates a PCIe network 300 comprising an upstream port 330 connected to end-point device 360, 370 via downstream ports 340, 350. As shown, the end-point devices 360, 370 are multi-function devices, with the end-point device 360 including functions 362, 364, 366, and the end-point device 370 includes functions 372, 374, 376. The PCIe network 300 may support RID based routing and address based routing. The downstream port 340 is assigned a first RID (RID1), the function 362 is assigned a second RID (RID2) and addresses 200-299, the function 364 is assigned a third RID (RID3) and addresses 300-399, the function 366 is assigned a fourth RID (RID4) and addresses 400-499, the downstream port 350 is assigned a fifth RID (RID5), the function 372 is assigned a sixth RID (RID6) and addresses 600-699, the function 374 is assigned a seventh RID (RID7) and addresses 700-799, and the function 376 is assigned an eighth RID (RID8) and addresses 800-899.

Figure 3B:
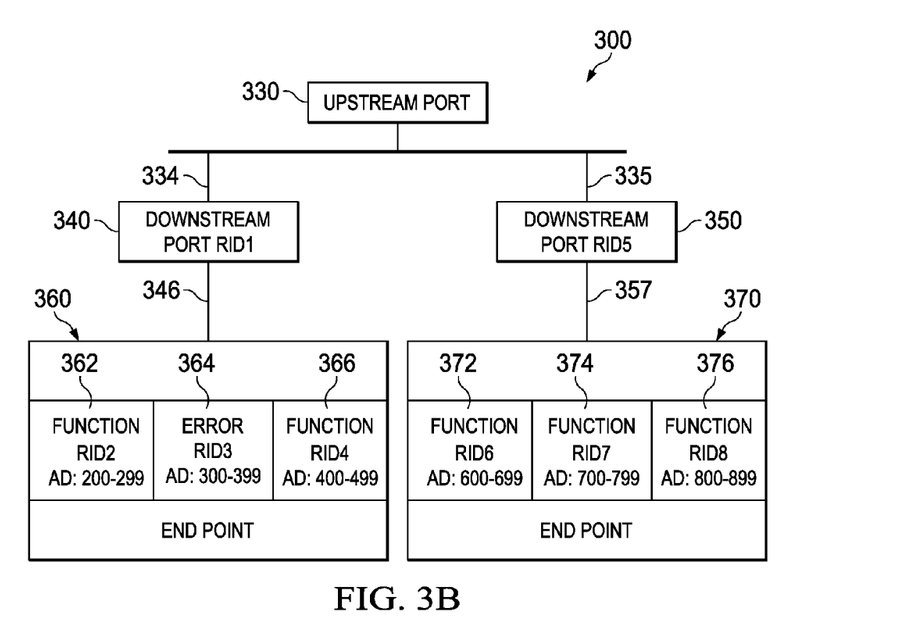

Occasional non-fatal errors generally only affect a single end-point function of an end-point device. FIG. 3B illustrates an instance in which the downstream port 340 detects a non-fatal error in the function 364. The downstream port 340 is configured for per-Function DPC, and therefore filters packets destined for the function 364 without disabling the link 346. More specifically, the downstream port 340 is configured to filter packets carrying RID3 or an address in the range of address 300-399, while continuing to communicate packets carrying RID2/RID4 or addresses within the ranges 200-299/400-499 over the link 346. In some embodiments, the packets may be filtered in both the ingress and egress directions.

The following is an example of how the downstream port 340 can initiate per-Function DPC. The downstream port 340 receives a read or write request from the upstream port carrying the RID3 or an address in the range 300-399, and proceeds to create an entry in a scoreboard table so as to track the status of the request. The downstream port 340 then forwards the request over the link 346, and waits for a response. After forwarding the request, the downstream port 340 may detect an error on the function 364 in various ways. In one example, a timeout period expires before a completion packet is received. In another example, the downstream port 340 receives an error message or a completion packet that includes a completion abort (CA) status or an unsupported request (UR) status. In embodiments, the completion packet includes an identifier (e.g., a tag field) associated with the forwarded read or write request. This identifier may be used to identify the RID or address carried in the previously forwarded request packet by referencing the scoreboard table to identify an entry associated with the identifier. Alternatively, the error message or completion packet may directly carry the RID3 and/or an address in the range 300-399. After determining that the function 364 has suffered a non-fatal error, the downstream port 340 may send a synthesized error message or a completion packet carrying the RID1 to the upstream port 330 to avoid a timeout in the upstream port 330. In this example, the downstream port 340 may be a PCIe switch downstream port or a root port. In some embodiments, the upstream port 330 may disregard the synthesized error message and continue to forward the error message upstream when the synthesized error message carries an RID associated with a downstream port. In this way, per-Function DPC filtering only needs to be performed within downstream ports. Alternatively, the upstream port 330 may perform per-Function DPC in parallel to the downstream port 340, in which case the filtering operations are distributed/duplicated across the PCIe fabric. This may improve redundancy and/or provide per-Function DPC support regardless of the downstream port components used.

Figure 4:
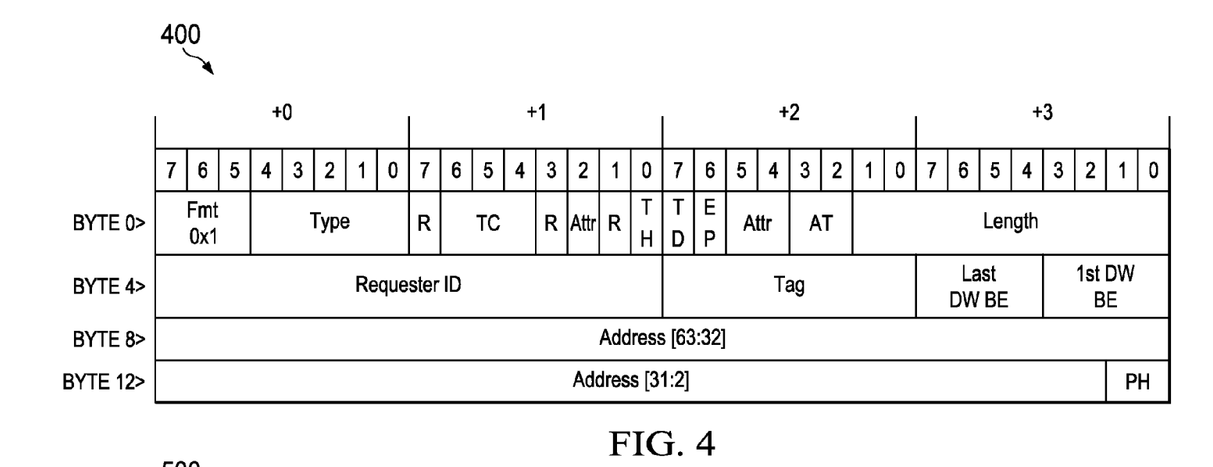
FIG. 4 illustrates a diagram of a request header format.
Figure 5:
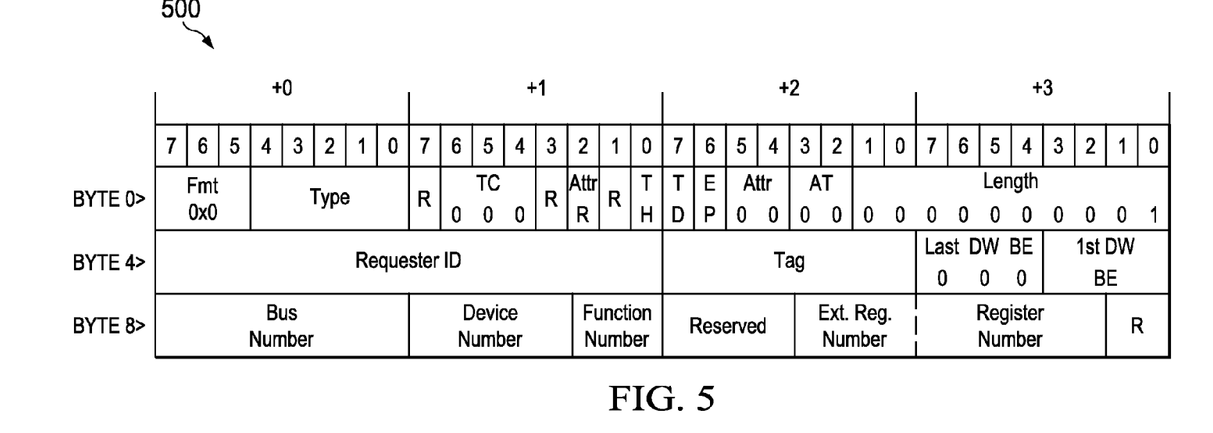
FIG. 5 illustrates a diagram of another request header format.

Request packets can carry either an RID or an address of an end-point function. FIG. 4 illustrates a request header format 400 carrying an address (e.g., 64-bit addressing of memory) of an end-point function, as might be included in a read or write request. As shown, the request header format 400 specifies one or more address/address-ranges assigned of an end-point function as well as a requester ID of a requesting device (e.g., Root Complex, Endpoint, etc.). FIG. 5 illustrates a request header format 500 carrying an RID of an end-point function, as might be included in a read or write request.

Figure 6:
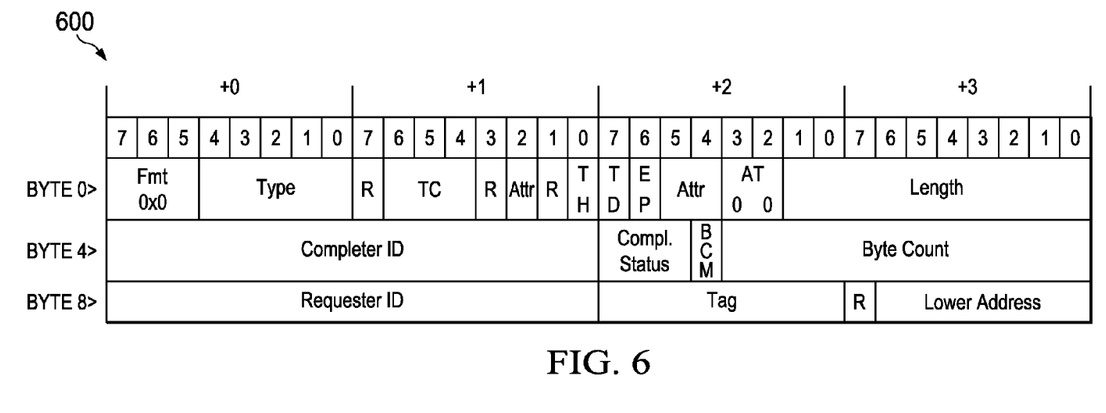
FIG. 6 illustrates a diagram of a completion header format.
Figure 7:
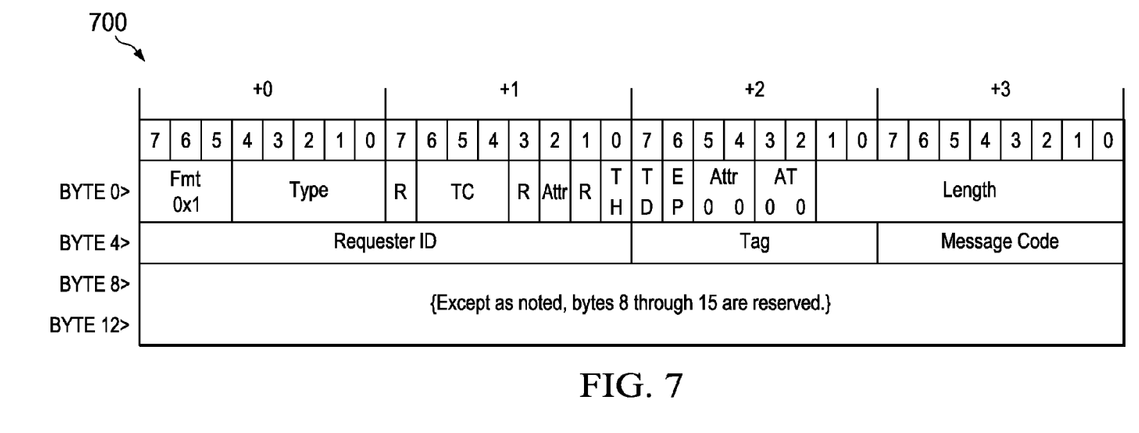
FIG. 7 illustrates a diagram of an error message format.

Non-fatal errors can be detected by receiving error messages or completion packets carrying completion abort (CA) or unsupported request (UR) status. FIG. 6 illustrates a completion header format 600. As shown, the completion header format 600 includes completer ID, requester ID, completion status, and tag fields. Completion packets are used for Non-posted requests, e.g., read requests, that require completions. The completion status field may carry the CA or UR status. The tag field matches an open request and the Completer ID field identifies the target of the original request. FIG. 7 illustrates an error message format 700. As shown, the error message may include a requester ID. PCIe error messages are used to report errors when handling posted requests do not have completions, e.g., memory writes. The Requester ID field of the error message either matches the device that generate the message or the downstream ports that are upstream to the device.

Figure 8:
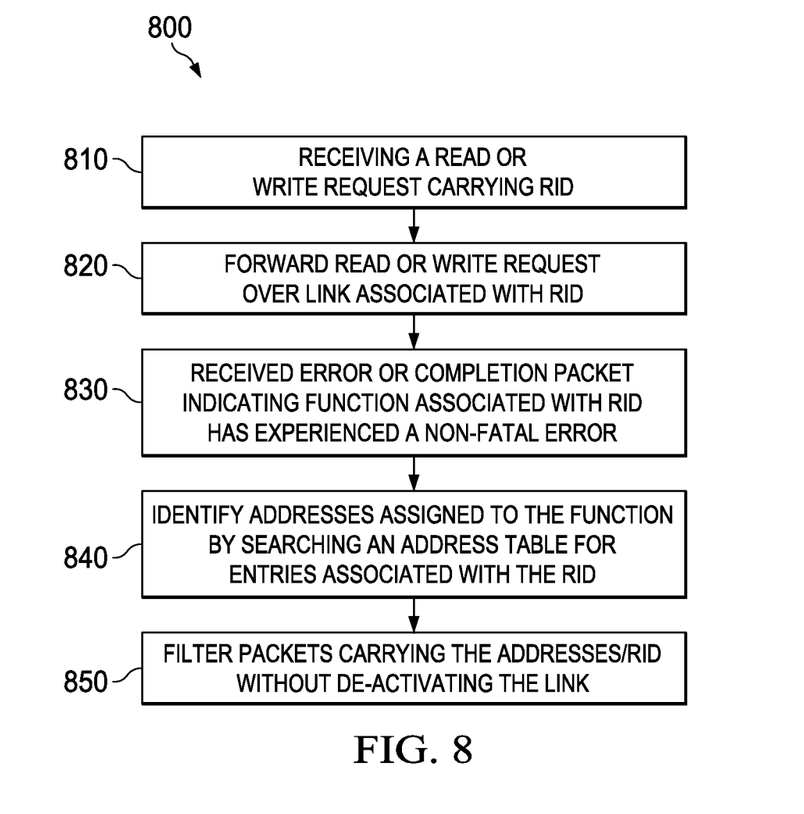
FIG. 8 illustrates a flowchart of an embodiment method for performing per-Function DPC.

Aspects of this disclosure provide methods for performing per-Function DPC. FIG. 8 illustrates a method 800 for performing per-Function DPC, as might be performed by a downstream PCIe port. As shown, the method 800 begins with step 810, where the PCIe port receives a read or write request carrying an RID. Thereafter, the method 800 proceeds to step 820, where the PCIe port forwards the read or write request over a link associated with the RID. Subsequently, the method 800 proceeds to step 830, where the PCIe receives an error message or a completion packet over the link. The error message or completion packet indicates that a function associated with the RID has experienced a non-fatal error. Next, the method 800 proceeds to step 840, where the PCIe port identifies addresses assigned to the function by searching an address table for entries corresponding to the RID. Each entry may associate the RID with an address or range of addresses assigned to the function. Thereafter, the method 800 proceeds to step 850, where the PCIe port filters packets carrying the RID or addresses assigned to the function without de-activating the link.

Figure 9:
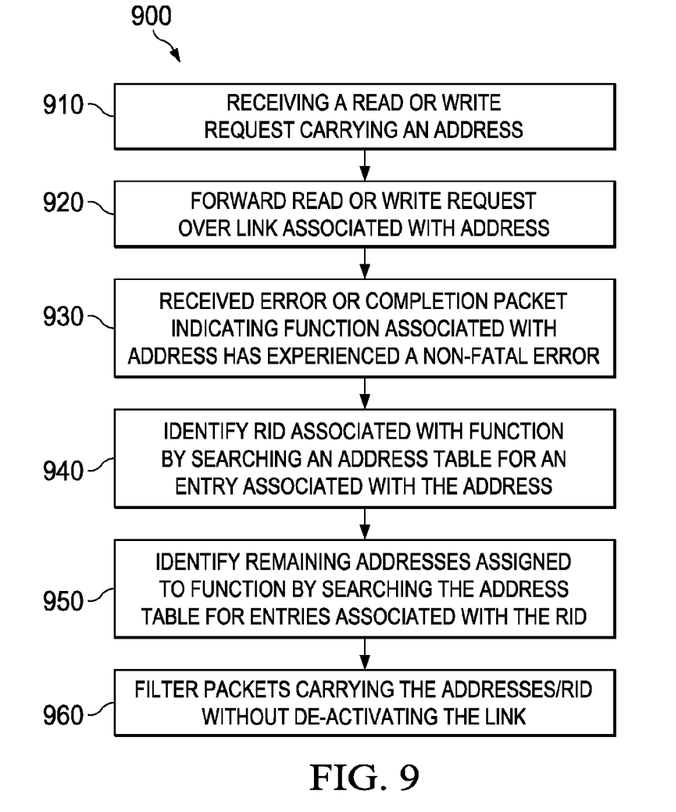
FIG. 9 illustrates a flowchart of another embodiment method for performing per-Function DPC.

In some embodiments, techniques for performing per-Function DPC include mapping addresses to RIDs. FIG. 9 illustrates a method 900 for performing per-Function DPC, as might be performed by a PCIe port. As shown, the method 900 begins at step 910, where the PCIe port receives a read or write request carrying an address. Thereafter, the method 900 proceeds to step 920, where the PCIe port forwards the read or write request over a link associated with the function. Subsequently, the method 900 proceeds to step 930, where the PCIe receives an error message or completion packet over the link. The error message or completion packet indicates that the function associated with the address has experienced a non-fatal error. Next, the method 900 proceeds to step 940, where the PCIe port identifies an RID assigned to the function by searching an address table for entries corresponding to the address. Subsequently, the method 900 proceeds to step 950, where the PCIe port identifies remaining addresses assigned to the function by searching an address table for entries corresponding to the identified RID. Thereafter, the method 900 proceeds to step 960, where the PCIe port filters packets carrying the RID or addresses assigned to the function without de-activating the link.

In some embodiments, PCIe transactions may include both posted transactions (e.g., MemWr) and non-posted transactions (e.g., Cfg, IO, MemRd, etc.). In embodiments, PCIe errors may include correctable errors, and uncorrectable errors. Uncorrectable errors can be either fatal or non-fatal. DPC may be an optional capability that is triggered by uncorrectable errors. When DPC is triggered, the entire link is disabled, necessary completions are synthesized, and neither further upstream nor downstream transaction layer packets are accepted. Advantageously, DPC offers a more robust and standardized error containment that stops errors resulting from further TLPs, reduces timeouts through synthesized completions, and isolates the error to be handled by software using detailed header logs, thereby increasing the likelihood of error recovery. However, once the link is disabled, the entire sub-hierarchy can be affected, which penalizes the PCIe fabric by forcing costly and potentially unmanageable recovery on all devices in the sub-hierarchy. This problem is exacerbated in single root input output virtualization (SR-IOV) devices, which can have dozens (or even hundreds) of PCIe functions.

Aspects of this disclosure provide per-Function DPC for ID based routing and address based routing. A PCIe RID may be a routing ID that includes a bus number, device number, and function number (<Bus#><Dev#><Func#>).

Per-Function DPC may be triggered by non-fatal errors, and may include a transaction oriented approach that can reliably identify end-point function RIDs and/or addresses. Non-fatal errors can arise under various circumstances, such as poisoned TLPs, completion timeouts, completer aborts, unexpected completions, end-to-end cyclic redundancy check (ECRC) errors, unsupported requests, access control service (ACS) violations, multicast (MC) blocked TLP errors, atomic egress blocked error, TLP prefix blocked errors, and others. Non-Fatal messages can originate from end-point devices or from downstream ports.

Downstream requests can include an address or RID associated with an endpoint function. Flows to endpoint devices may be recorded as open transactions on a scoreboard. Endpoint devices may respond with completion packets indicating a status and/or error messages. Completions packets indicating an error status may be stamped with an endpoint function RID to identify a PCIe function which has been blocked from further access (logical link down).

Completion packets indicating an error status may be stamped with a downstream port RID or an end-point function RID. The completion packets may include a matching completion tag associated with an endpoint RID in a scoreboard table or an endpoint function address that can be matched to an endpoint function RID in an address table.

Non-fatal error messages may typically flow towards a root complex, and can include either an endpoint function RID or a downstream port RID. The non-fatal error message may be stamped with an endpoint function RID to identify a PCIe function which has been blocked from further access (logical link down). The non-fatal error message may be stamped with a downstream port RID when a downstream port has initiated per-Function DPC for the function affected by the error. Accordingly, a PCIe port receiving a non-fatal error message carrying a downstream port RID may disregard the non-fatal error message.

Upstream components (Root Complex, Root Port, and switches) may snoop the PCIe configuration space accesses during PCIe fabric enumeration and discover the RIDs of downstream switch ports (vs. end points) as the device type register that indicates whether a device is an endpoint or a switch port is located at well-known addresses. The result of the snoop can be stored in the address table within the upstream components that implement pF-DPC.

A scoreboard can be managed by PCIe ports configured for per-Function DPC. These scoreboards may be similar in some respects to those found in existing root complex/ports, and may be used to record outstanding transactions in order to match with completions. An input for the scoreboard can be a tag output, an RID, or an address. Table 1 below illustrates an example of a scoreboard.

TABLE 1

| Tag | Addr/RID | Value |
|---|---|---|
| 0 | Addr | 0x12345678 |
| 1 | RID | 5, 0, 3 |
| . | | |
| . | | |
| . | | |
| 255 | | |

An address table can be managed by PCIe ports configured for per-Function DPC. An address table may be configured to record address ranges (e.g., BARs), the RID of the PCIe function the table entry belongs to, and whether the device is an endpoint or switch port. Address tables may be maintained separately for SR-IOV virtual functions. Different numbers of BARs or address ranges can be maintained for legacy functions, SR-IOV physical functions (PFs), and virtual functions (VFs). BARs/address-ranges for legacy functions and SR-IOV physical functions can be learned by snooping during PCIe fabric enumeration. More specifically, an operating system may enumerate a PCIe fabric by accessing the fabric's configuration space registers. The accesses show up on the PCIe links as configuration transactions (ID routing). If a downstream port sees such transactions flowing downstream, it can examine the packet and determine whether the BARs are being accessed and configured since the BARs of non-VF devices (legacy and PF devices) are located at well-known addresses. Hence, a downstream port hardware can build an entire address map on its own by "snooping". BARs/address-ranges for VFs can be programmed by software upon enumeration. Table 2 below illustrates an example of an address table maintained for a legacy or physical function, and Table 3 below illustrates an example of an address table maintained for a virtual function.

TABLE 2

| RID | BAR# 0-5 | BAR Base | BAR Size | Device Type |
|---|---|---|---|---|
| 5, 0, 3 | BAR0 | 0x2340000 | 4 KB | 0 or 1 |
| . | | | | |
| . | | | | |
| . | | | | |

TABLE 3

| PF RID | VF BAR# | BAR Base | BAR Size | Num VF | VF Stride | 1st VF Offset |
|---|---|---|---|---|---|---|
| 5, 0, 1 | 0 | 0x23500000 | 4 KB | 16 | 1 | 15 |
| . | | | | | | |
| . | | | | | | |
| . | | | | | | |

Per-Function DPC may be implemented in downstream ports, and therefore be physically closer to the source of the error and may be more effective than techniques for function level containment confined to the root complex.

In embodiments, a downstream port with pF-DPC capability may be configured to record an end-point function's RID and/or addresses in a status register, to stop any traffic involving the device/function in question (both directions), to filter new requests/completions stamped with endpoint RID, to filter new requests with addresses matching endpoint RIDs by looking up entries in the address table, and to interrupt the software to report the fault event. Software can be configured to handle the error condition and/or to clear an error status. The downstream port hardware can then be configured to allow the device/function to be accessed again. The link between the PCIe port and the endpoint device providing the function affected by the error may remain active throughout the per-Function DPC recovery process.

In one embodiment, a downstream port may receive a PCIe read request carrying an address, and make an entry in a VF memory space register. The device/function associated with the address may have encountered faults and may not respond before a timeout. The downstream port may have pF-DPC capability, and may open a new scoreboard entry and record target addresses upon receiving the request transaction. The pF-DPC port may declare a timeout if a completion is not received before a timeout period expires, and may use the target address from the scoreboard to look up entries in an address table and identify a VF to which the address has been assigned. The pF-DPC port may determine the faulted VF's RID in accordance with the following formula: VF_RID=(Target_Addr−BAR_Base)/BAR_Size*VF_Stride+1stVF_Offset. The pF-DPC port may then filter new requests/completions stamped with VF's RID, filter new requests with addresses matching the RID, and record the VF_RID in a status register and report the fault to software via an interrupt.

Figure 10:
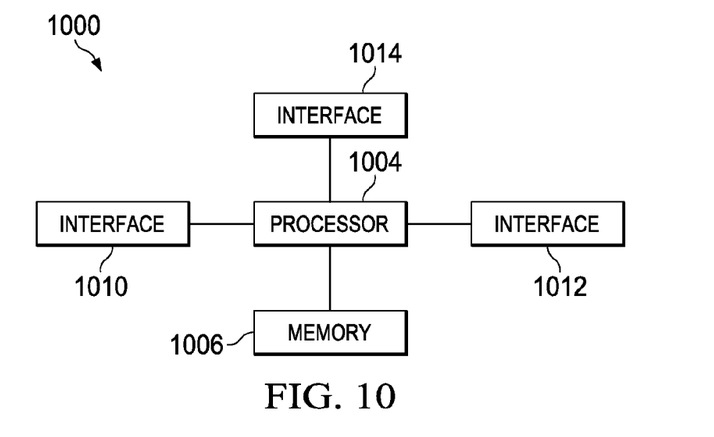
FIG. 10 illustrates a block diagram of an embodiment communications device.

FIG. 10 illustrates a block diagram of an embodiment of a device 1000, which may be equivalent to one or more devices discussed above. The device 1000 may include a processor 1004, a memory 1006, and a plurality of interfaces 1010, 1012, and 1014, which may (or may not) be arranged as shown in FIG. 10. The processor 1004 may be any component capable of performing computations and/or other processing related tasks, and the memory 1006 may be any component capable of storing programming and/or instructions for the processor 1004. The interfaces 1010, 1012, and 1014 may be any component or collection of components that allow the device 1000 to communicate data or control information to or from PCIe interfaces.

Although the description has been described in detail, it should be understood that various changes, substitutions and alterations can be made without departing from the spirit and scope of this disclosure as defined by the appended claims. Moreover, the scope of the disclosure is not intended to be limited to the particular embodiments described herein, as one of ordinary skill in the art will readily appreciate from this disclosure that processes, machines, manufacture, compositions of matter, means, methods, or steps, presently existing or later to be developed, may perform substantially the same function or achieve substantially the same result as the corresponding embodiments described herein. Accordingly, the appended claims are intended to include within their scope such processes, machines, manufacture, compositions of matter, means, methods, or steps.

We claim:

1. A method for per-function downstream port containment, the method comprising:
   receiving a read or write request on a Peripheral Component Interconnect (PCI) Express (PCIe) interface, the read or write request comprising a first routing identifier (RID) associated with a first function of an end-point device;
   detecting a non-fatal error of the first function of the end-point device;
   identifying a first range of addresses assigned to the first function of the end-point device by searching an address table for entries associated with the first RID; and
   filtering packets carrying the first RID or addresses within the first range of addresses without de-activating a link between the PCIe interface and the end-point device.

2. The method of claim 1, wherein each of the entries associate the first RID with an address in the first range of addresses assigned to the first function of the end-point device.

3. The method of claim 1, wherein identifying the first range of addresses assigned to the first function of the end-point device comprises:
   identifying one or more address ranges associated with the first RID in the address table.

4. The method of claim 3, further comprising:
   writing the entries into the address table prior to receiving the read or write request.

5. The method of claim 4, wherein writing the entries into the address table comprises:
   snooping configuration space access packets communicated to the first function of the end-point device to identify a device type associated with the first RID and to identify one or more addresses or address ranges associated with the first RID.

6. The method of claim 1, wherein the end-point device includes a second function that remains operational following the non-fatal error of the first function of the end-point device, the second function being assigned a second set of addresses that is different than the first range of addresses assigned to the first function.

7. The method of claim 6, wherein filtering packets carrying the first range of addresses without de-activating a link between the PCIe interface and the end-point device comprises:
   receiving a first traffic flow and a second traffic flow at the PCIe interface, the first traffic flow carrying one or more addresses in the first range of addresses, and the second traffic flow carrying one or more addresses in the second set of addresses; and
   forwarding the second traffic flow over the link without forwarding the first traffic flow over the link.

8. The method of claim 7 further comprising:
   dropping the first traffic flow; and
   sending an error message or a synthesized completion packet indicating a completion abort (CA) status or an unsupported request (UR) status to a sender of the first traffic flow, wherein the error message or completion packet carry a second RID associated with the PCIe interface.

9. The method of claim 1, wherein detecting the non-fatal error of the first function of the end-point device comprises:
   receiving an error message associated with the read or write request, wherein the error message includes the first RID.

10. The method of claim 1, wherein detecting the non-fatal error of the first function of the end-point device comprises:
    receiving a completion packet comprising a tag field identifying the read or write request, wherein the completion packet includes the first RID and a completion abort (CA) status or an unsupported request (UR) status.

11. The method of claim 1, wherein the PCIe interface is coupled to a PCIe downstream port configured to perform per-function downstream port containment, and wherein the method further comprises:
    receiving an error message or a completion packet that includes a completion abort (CA) status or an unsupported request (UR) status; and
    disregarding the error message or the completion packet when the error message or the completion packet indicates a downstream RID assigned to the PCIe downstream port.

12. A Peripheral Component Interconnect Express (PCIe) switching fabric comprising:
    an upstream PCIe interface; and
    a downstream PCIe interface coupled between the upstream PCIe interface and an end-point device, wherein the downstream PCIe interface is configured to receive a read or write request comprising a first routing identifier (RID) associated with a first function of the end-point device, to detect a non-fatal error on the first function of the end-point device, to identify one or more address ranges assigned to the first function of the end-point device by searching an address table for entries associated with the first RID, and to filter packets carrying the first RID or an address within the one or more address ranges without de-activating a link between the PCIe interface and the end-point device.

13. A method for per-Function downstream port containment, the method comprising:
    receiving a read or write request on a Peripheral Component Interconnect (PCI) interface, the read or write request comprising a first address assigned to a first function of an end-point device;
    detecting a non-fatal error on the first function of the end-point device;
    identifying a first routing identifier (RID) assigned to the first function of the end-point device by searching an address table for an entry associated with the first address; and
    filtering packets carrying the first RID without de-activating a link between the PCIe interface and the end-point device.

14. The method of claim 13, further comprising:
    identifying one or more address ranges assigned to the first function of the end-point device by searching the address table for entries associated with the first RID; and
    filtering packets carrying addresses with the one or more address ranges without de-activating a link between the PCIe interface and the end-point device.

15. The method of claim 13, wherein the entry associates the first RID with the first address, and wherein the first address is within a first address range assigned to the first function of the end-point device.

16. The method of claim 15, wherein the end-point device includes a second function that remains operational following the non-fatal error on the first function of the end-point device, the second function being assigned a second address range that is distinct from the first address range.

17. The method of claim 16, further comprising:
receiving a first traffic flow and a second traffic flow at the PCIe interface, the first traffic flow carrying one or more addresses within the first address range, and the second traffic flow carrying one or more addresses within the second address range; and
forwarding the second traffic flow over the link to the end-point device without forwarding the first traffic flow over the link.

18. The method of claim 13, wherein detecting the non-fatal error of the first function of the end-point device comprises:
receiving a first error message that includes an RID field identifying the first function or a downstream port.

19. The method of claim 13, wherein detecting the non-fatal error of the first function of the end-point device comprises:
receiving a completion packet comprising a field identifying the read or write request, wherein the completion packet includes a completion abort (CA) status or an unsupported request (UR) status.

20. A Peripheral Component Interconnect express (PCIe) switching fabric comprising:
an upstream PCIe interface; and
a downstream PCIe interface coupled between the upstream PCIe interface and an end-point device, wherein the downstream PCIe interface is configured to receive a read or write request carrying a first address assigned to a first function of an end-point device, to detect a non-fatal error on the first function of the end-point device, to identify a first routing identifier (RID) assigned to the first function of the end-point device by searching an address table for an entry associated with the first address, and to filter packets carrying the first RID without de-activating a link between the PCIe interface and the end-point device.

21. The PCIe switching fabric of claim 20, wherein the downstream PCIe interface is further configured to identify one or more address ranges assigned to the first function of the end-point device by searching the address table for entries containing the first RID, and to filter packets carrying the addresses within the one or more address ranges without de-activating the link between the PCIe interface and the end-point device.

22. A computer program product comprising a computer readable storage medium storing programming, the programming including instructions to:
receive a read or write request on a Peripheral Component Interconnect (PCI) Express (PCIe) interface, the read or write request comprising a first routing identifier (RID) associated with a first function of an end-point device;
detect a non-fatal error of the first function of the end-point device;
identify a first range of addresses assigned to the first function of the end-point device by searching an address table for entries associated with the first RID; and
filter packets carrying the first RID or addresses within the first range of addresses without de-activating a link between the PCIe interface and the end-point device.

23. The computer program product of claim 22, wherein each of the entries associate the first RID with an address in the first range of addresses assigned to the first function of the end-point device.

24. The computer program product of claim 22, wherein the instructions to identify the first range of addresses assigned to the first function of the end-point device include instructions to:
identify one or more address ranges associated with the first RID in the address table.

* * * * *